Nov. 5, 1929.  O. LARSEN  1,734,586
AUTOMATIC LIQUID SUPPLY VALVE
Filed Jan. 18, 1928  2 Sheets-Sheet 1

Inventor
Olaf Larsen.
By Tindall, Parker & Carlson
Attys

Nov. 5, 1929.   O. LARSEN   1,734,586
AUTOMATIC LIQUID SUPPLY VALVE
Filed Jan. 18, 1928   2 Sheets-Sheet 2
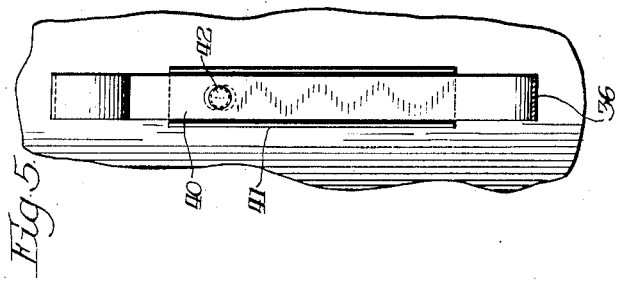
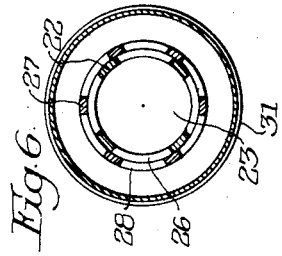
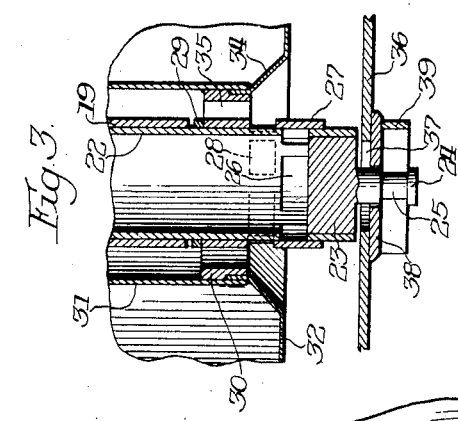
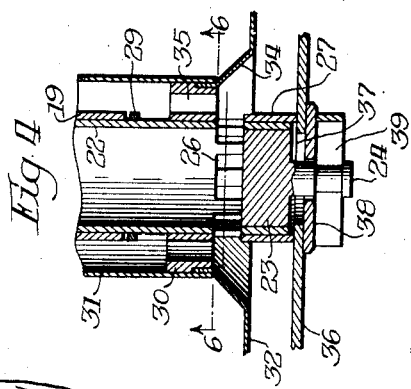
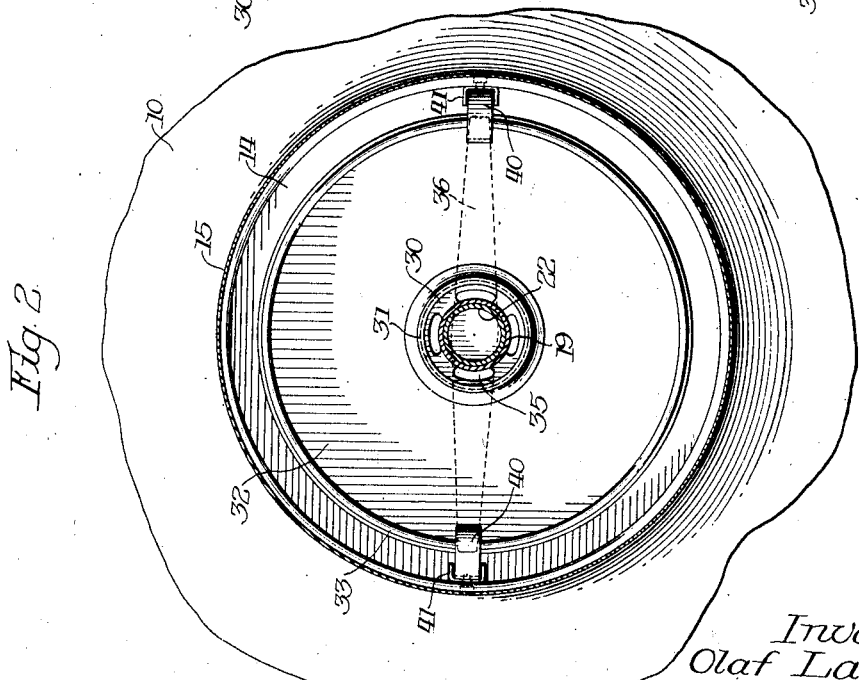
Inventor
Olaf Larsen.
By Chindahl Parker Carlson
Attys.

Patented Nov. 5, 1929

1,734,586

UNITED STATES PATENT OFFICE

OLAF LARSEN, OF FORT ATKINSON, WISCONSIN, ASSIGNOR TO THE CREAMERY PACKAGE MFG. COMPANY, OF CHICAGO, ILLINOIS, A CORPORATION OF ILLINOIS

AUTOMATIC LIQUID-SUPPLY VALVE

Application filed January 18, 1928. Serial No. 247,535.

The invention relates to automatic valves in bottle filling machines for controlling the supply of liquid to a reservoir from which the bottles are filled, and more particularly relates to a float type of valve associated with a revolving reservoir in a machine for bottling milk.

It is essential in filling machines wherein the bottles are filled by gravity that a substantially uniform level of liquid and consequent uniform liquid pressure be maintained in the reservoir. It is also essential to avoid frothing in handling milk that the flow be controlled without undue agitation or drop. In a machine employing a revolving reservoir, which may also be adjustable in position longitudinally of its axis, the support therein for the supply valve must permit of relative movement between the reservoir and the supply line, and all parts must be adapted for being taken apart readily for sterilizing after use.

The principal object of the invention is to provide a float-operated valve to be connected to a supply pipe for automatically controlling the flow of milk to a reservoir operatively mounted for rotary or axial movement, or for both, and which valve may be removably supported upon the reservoir structure in constant relation thereto.

Further objects are to provide readily detachable supporting means for an expansible valve structure capable of relative rotation therewith, an improved float construction having no enclosed pockets inaccessible for cleaning, and an arrangement of submerged valve discharge ports and float structure which directs downward the incoming flow to prevent the incorporation of air and frothing.

Other objects and advantages will be apparent in the following detailed description of a preferred embodiment of the invention illustrated in the accompanying drawings, and in which—

Fig. 2 is a sectional plan view taken on the plane of the line 2—2 in Fig. 1, illustrating the valve structure and its support.

Fig. 3 is a fractional portion of the valve structure in vertical section showing the valve in closed position.

Fig. 4 is a similar fractional sectional view showing the valve in open position.

Fig. 5 is a detailed view in elevation of one of the lateral supports for the valve structure.

Fig. 6 is a cross sectional view looking upward on the plane of the line 6—6 in Fig. 4.

Figure 1:
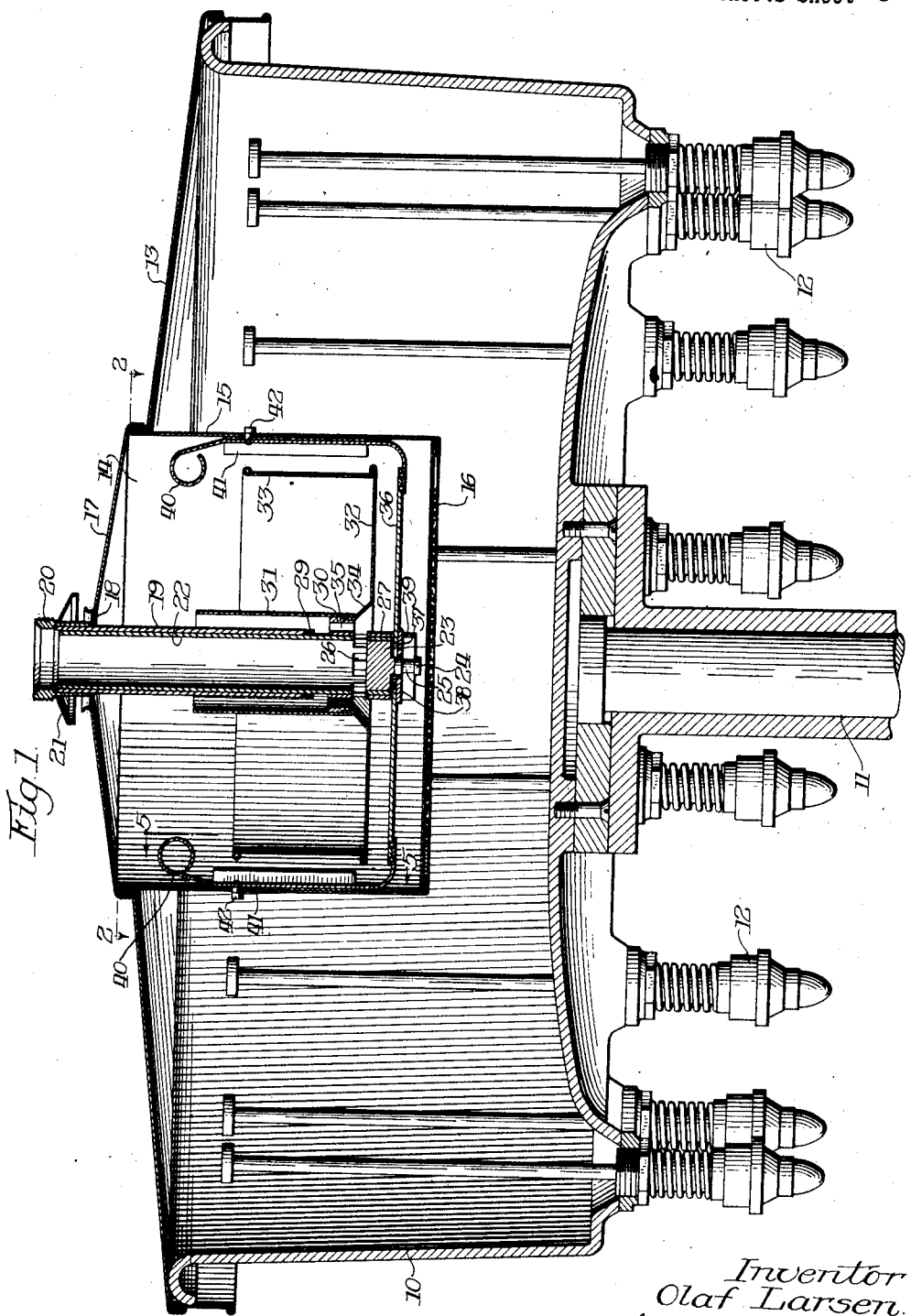
Figure 1 illustrates a vertical sectional view of a reservoir, as employed in a bottle filling machine, with the float valve and associated parts incorporated therewith.

Referring to Fig. 1 the numeral 10 indicates a reservoir or filling tank having an open upper side and centrally mounted upon a rotatable and longitudinally adjustable support 11 forming part of a bottle filling machine of well known type. The machine structure not forming a part of this invention, is, therefore, not otherwise illustrated herein. The reservoir 10 is provided with an annular series of spaced filler valves 12 through which milk or other liquid is discharged from the reservoir into bottles elevated into contact with the lower ends of the valves 12. The reservoir is provided with a removable cover 13 in which is axially provided a milk receiving chamber 14 having preferably cylindrical side walls 15 joined to the reservoir cover 13, and a lower wall 16 comprising a screen.

The chamber 14 is upwardly enclosed by a removable cover 17 having a central opening 18 through which extends a milk supply tube 19. To the upper end of the tube 19 is secured a conventional union ferrule 20 for attachment to a supply pipe terminating above the position of the milk tube 19.

The tube 19 also carries a sloping canopy 21 sealed thereto and extending outwardly of the opening 18 in the cover over the chamber 14. The canopy 21 serves to receive any condensation forming on the cold supply pipe thereabove, and which would otherwise flow down the milk tube into the milk receiving chamber with the result of possibly contaminating the pasteurized milk delivered to the reservoir.

Associated with the milk tube 19 is a telescoping valve tube 22 preferably mounted telescopically within the milk tube and adapted for free longitudinal movement therein. The valve tube 22 is closed at its lower end by means of a plug 23 secured therein, the plug being provided at its underside with an axially extending pin 24 preferably having an annular channel 25 formed in the lower portion thereof. Immediately above the plug 23, laterally opening ports 26 are provided in the valve tube which are controlled by means of a valve sleeve 27 positioned outwardly of the tube 22 and slidable longitudinally thereupon. The sleeve 27 is provided with lateral ports 28 which, in the lower position of the sleeve 27, are in register with the ports 26.

The upward movement of the sleeve 27 effects the partial or complete closure of the discharge ports 26 by the lower portion of the sleeve, as the sleeve ports are moved upwardly out of register with the tube ports. The upward movement of the sleeve 27 is limited preferably by means of a stop ring 29 secured to the tube 22.

The upper end of the sleeve 27 carries a radially extending ring or flange 30 which may be secured to or formed integrally with the sleeve 27. The ring 30 carries an annular float structure comprising an inner preferably cylindrical vertical wall 31 mounted on the ring, and surrounding and spaced from the milk and valve tubes. A lower wall 32, also mounted on the ring, extends radially therefrom and carries at its outer margin an outer vertical wall 33 forming with the inner wall an upwardly open float structure. The latter is displaced by the inflow of milk into the chamber 14 with the effect of elevating the sleeve 27 and closing the discharge ports.

The bottom wall of the float structure at its inner margin is provided with a conically inclined portion 34 positioned laterally of the ports 26 with the effect that the milk discharged through the ports meets the inclined wall 34 and is deflected downward thereby toward the screen 16. The ring 30 is preferably provided with longitudinal openings 35 formed therein to permit the passage of liquid between the inner wall 31 of the float structure and the tubes 19 and 22, and thus allowing any milk escaping from between the milk tube 19 and valve tube 22 to enter the body of milk in the chamber 14 without unbalancing the normal displacement of the float structure.

Positioned diametrically across the milk chamber 14 and beneath the valve tube 22, is a supporting bar 36 having an axial opening 37 to receive the pin 24 formed on the lower end of the tube plug, the bar 36 and tube 22 being removably retained in rotatable relation by means of a washer 38 positioned beneath the bar 36 and detachably secured in position by a spring cotter 39 positioned in the channel 25 formed in the pin.

The bar 36 is provided at its outer ends with a pair of vertically extending spring members 40 which bear resiliently within a pair of channel members 41 secured to the vertical wall 15 of the milk chamber. The channels 41 and wall 15 are provided with openings therethrough, in each of which is removably engaged a pin 42 fixed on the respective spring members 40 and functioning to secure the latter against displacement from normal position in the channel members 41. The spring members 40 may be provided with finger loops by which the members may be deflected inward to withdraw the pins 42 and to lift the supporting bar 36 and the entire valve structure out through the upper end of the milk chamber 14.

In operation, the revolving tank 10 carries with it its cover 13 and the receiving chamber wall structure 15 mounted in the cover. Such rotative movement is imparted to the supporting bar 36 which is normally rotative about the pin 24, at the same time maintaining the position of the ports 26 in the milk tube in constant relation to the desired level of milk in the reservoir. At the beginning of the filling operation the valve ports are open and the valve sleeve 27 rests upon the supporting bar 36. With the inflow of milk to the point of effecting a buoyant displacement of the float structure, the latter rises and carries with it the valve sleeve 27, thereby constricting or closing the ports 26 and maintaining uniform level of the liquid in the reservoir 10.

Upon completion of the bottle filling operations, disconnection of the union joint with the ferrule 20 permits withdrawal of the milk tube 19, and upon removal of the cover 17 the entire valve structure and its support may be lifted out of the milk chamber 14, thus withdrawing all obstruction to thorough cleansing of the chamber. With the removal of the spring cotter 39 the supporting bar 36 may be separated from the valve tube 22 and the valve sleeve 27 withdrawn from the valve tube, thus separating all parts of the valve structure for thorough cleaning and sterilizing. It will be noted that the open upper side of the float structure permits thorough cleaning of the latter without the possibility of any internal chambers containing any inaccessible surfaces preventing perfect sterilization of the float structure.

The pivoted relation between the valve structure and its support permits of a certain amount of weaving in the rotation of the heavy reservoir without strain upon the valve parts, by reason of the enlarged opening 37 in the supporting bar through which the pin 24 extends. Also the telescoping relation between the milk tube 19 and the valve tube 22 permits the raising and lowering of the reservoir 10, as is necessary in filling bottles of different heights, without disturbing the stationary mounting of the supply piping and also without disturbing the position of the discharge ports in the valve structure with relation to the uniform level to be maintained in the reservoir.

I claim as my invention:

1. In combination with a rotatable reservoir and a pipe for supplying liquid thereto, a support mounted in constant relation to said rotatable reservoir, a tubular structure connected to said pipe and extending into said reservoir, one end of said tubular structure having a pivotal bearing upon said support, a discharge orifice in said tubular structure and a float-operable valve for controlling said orifice.

2. In combination with a reservoir mounted for rotary and axial movement and a stationary pipe for supplying liquid thereto, a support mounted in constant relation to said reservoir, an expansible tubular structure having one end attached to said pipe and the other end pivotally attached to said support, a discharge port in said tubular structure, and a float-operable valve for controlling said port.

3. In combination with a rotatable reservoir having a cover and a pipe for supplying liquid thereto, a wall supported upon said cover and defining a liquid receiving chamber communicating with said reservoir, a support carried by said wall, a tubular structure connected to said pipe and extending into said chamber, said tubular structure having a pivotal bearing upon said support, a discharge orifice in said tubular structure, and a float-operable valve for controlling said orifice.

4. In combination with a reservoir mounted for rotary and axial movement and having a cover and a pipe for supplying liquid thereto, a wall supported upon said cover and defining a liquid receiving chamber communicating with said reservoir, a support carried by said wall, a longitudinally expansible tubular structure having one end attached to said pipe and the other end pivotally attached to said support, a discharge port in said tubular structure, and a float-operable valve for controlling said port.

5. A device for automatically controlling the flow of liquid from a supply pipe to a rotatable reservoir comprising a bar, means for supporting said bar in contant relation to said reservoir, a tube adapted for connection with said pipe, a second tube having relatively adjustable connection with said first tube and having a discharge port, said second tube having a closed end pivotally supported on said bar, a sleeve valve controlling said port, and a float for operating said valve.

6. A device for automatically controlling the flow of liquid from a stationary supply pipe to a rotatable and axially movable reservoir comprising a bar, means for supporting said bar in constant relation to said reservoir, a tube adapted for connection to said pipe, a second tube in telescopic relation to said first tube and having a closed end pivotally supported on said bar, said second tube having a discharge port, a sleeve valve operatively mounted on said second tube for controlling said port, and a float for operating said valve.

7. A device for automatically controlling the flow of liquid from a supply pipe to a rotatable reservoir comprising a tubular structure adapted for connection to said pipe and having a pivot pin formed on a portion thereof extending into said reservoir, a support mounted in constant relation to said reservoir, said support having an open for the reception of said pin in substantially spaced relation to the wall of said opening, detachable means for operatively securing said pin in said opening to permit rotary and limited lateral movement of said pin relative to said support, a discharge orifice in said tubular structure, and a float-operable valve for controlling said orifice.

8. In a device of the class described, in combination, a chamber wall, a pair of oppositely positioned channel members mounted on said wall, a bar extending across said chamber, a pair of elements oppositely attached to and supporting said bar and removably secured in said channels respectively, and a float-controlled valve structure pivotally supporting upon said bar and adapted for connection with a source of flowing liquid.

9. In a device of the class described, a tube having port openings, a sleeve valve operatively mounted on said tube for the control of said port openings, a ring mounted on said sleeve, an annular float carried by said ring and having an inner wall spaced from said tube, said ring having openings therethrough for communication between the space within the inner wall of said float and the space below said float.

10. In a device of the class described, a tube having port openings, a valve sleeve mounted on said tube and operable to control said port openings, a ring mounted on said sleeve having openings therethrough longitudinally of said tube, and a float structure mounted on said ring having an inner wall surrounding and spaced from said tube, an outer lateral wall, and a bottom wall connecting said inner and outer walls in sealed relation.

In testimony whereof, I have hereunto affixed my signature.

OLAF LARSEN.